(12) United States Patent
Singh et al.

(10) Patent No.: US 10,708,528 B2
(45) Date of Patent: Jul. 7, 2020

(54) IMAGE SENSORS HAVING DUMMY PIXEL ROWS

(71) Applicant: SEMICONDUCTOR COMPONENTS INDUSTRIES, LLC, Phoenix, AZ (US)

(72) Inventors: Gurvinder Singh, Bangalore (IN); Bharat Balar, Bengaluru (IN)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 121 days.

(21) Appl. No.: 15/992,975

(22) Filed: May 30, 2018

(65) Prior Publication Data

US 2019/0373199 A1 Dec. 5, 2019

(51) Int. Cl.
| | |
|---|---|
| H04N 5/365 | (2011.01) |
| H04N 5/3745 | (2011.01) |
| H04N 5/378 | (2011.01) |
| H04N 5/369 | (2011.01) |
| H04N 13/144 | (2018.01) |

(Continued)

(52) U.S. Cl.
CPC ......... *H04N 5/3658* (2013.01); *H04N 5/2357* (2013.01); *H04N 5/3698* (2013.01); *H04N 5/378* (2013.01); *H04N 5/3745* (2013.01); *H04N 13/144* (2018.05); *H04N 5/3765* (2013.01)

(58) Field of Classification Search
CPC ....... H04N 5/357–3675; H04N 5/3698; H04N 5/3745; H04N 5/3765; H04N 5/378; H04N 5/2357; H04N 13/144
See application file for complete search history.

(56) References Cited

U.S. PATENT DOCUMENTS

| | | |
|---|---|---|
| 6,344,877 B1 | 2/2002 | Gowda et al. |
| 6,532,040 B1 | 3/2003 | Kozlowski et al. |

(Continued)

OTHER PUBLICATIONS

Silsby et al., "A 1.2MP 1/3" CMOS Image Sensor with Light Flicker Mitigation," on Semiconductor. (No Date).

(Continued)

*Primary Examiner* — Lin Ye
*Assistant Examiner* — Chriss S Yoder, III
(74) *Attorney, Agent, or Firm* — Treyz Law Group, P.C.; Tianyi He (57) ABSTRACT

An image sensor may include active pixel rows that are used to generate image signals in various modes of operation. The active pixel rows may receive control signals that have corresponding sets of transitions. These sets of transitions may occur during readout operations for some active pixel rows but not during readout operations for other active pixel rows, especially in the case where frames of multiple types are generated by the same pixel array in an interweaved manner. This can lead to different readout environments for readout operations corresponding to different active pixel rows due to control signal coupling effects. To mitigate these adverse effects, an image sensor may include dummy pixel rows that continuously pulse the sets of transitions during the readout operation of any active pixel row to ensure that the readout operations for all active pixel rows have the same readout environments.

20 Claims, 6 Drawing Sheets

(51) Int. Cl.
*H04N 5/235* (2006.01)
*H04N 5/376* (2011.01)

(56) References Cited

U.S. PATENT DOCUMENTS

| | | | |
|---|---|---|---|
| 8,890,982 B2* | 11/2014 | Kato | H01L 27/14609 348/241 |
| 2009/0200454 A1 | 8/2009 | Barbier et al. | |
| 2011/0032391 A1* | 2/2011 | Cheung | H04N 5/2176 348/241 |
| 2014/0078349 A1 | 3/2014 | Velichko et al. | |
| 2016/0050376 A1 | 2/2016 | Fridental | |
| 2017/0155839 A1 | 6/2017 | Yamazaki et al. | |

OTHER PUBLICATIONS

Velichko et al., "140 dB Dynamic Range Sub-electron Noise Floor Image Sensor," on Semiconductor. (No Date).

Silsby, et al., "A 1.2MP 1/3" CMOS Image Sensor with Light Flicker Mitigation," 2015 International Image Sensor Workshop, Jun. 11, 2015, Vaals, The Netherlands.

Velichko et al., "140 dB Dynamic Range Sub-electron Noise Floor Image Sensor," 2017 International Image Sensor Workshop, May 30-Jun. 2, 2017, Hiroshima, Japan.

* cited by examiner

IMAGE SENSORS HAVING DUMMY PIXEL ROWS

BACKGROUND

This relates generally to imaging devices, and more particularly, to imaging devices having dummy pixel rows.

Image sensors are commonly used in electronic devices such as cellular telephones, cameras, and computers to capture images. In a typical arrangement, an electronic device is provided with an array of image pixels arranged in pixel rows and pixel columns. Circuitry is commonly coupled to each pixel column for reading out image signals from the image pixels.

The image pixels each contain a photodiode for generating charge in response to image light and a corresponding charge storage region. The image pixels may be configured to have a wide range of functionalities including light-flickering mitigation (LFM), charge overflow, and high dynamic range (HDR). However, in various modes of operation, the image pixels may be subject to undesirable image artifacts because of signal coupling during pixel image readout.

It would therefore be desirable to be able to provide imaging devices with improved image sensors.

DETAILED DESCRIPTION

Electronic devices such as digital cameras, computers, cellular telephones, and other electronic devices may include image sensors that gather incoming light to capture an image. The image sensors may include arrays of image pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
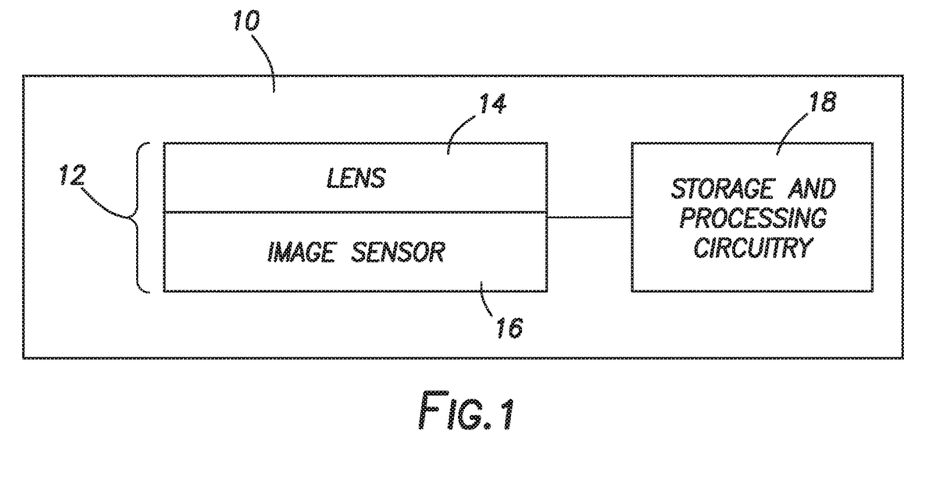
FIG. 1 is a diagram of an illustrative electronic device having an image sensor and processing circuitry for capturing images using an array of image pixels in accordance with an embodiment.

FIG. 1 is a diagram of an illustrative imaging system such as an electronic device that uses an image sensor to capture images. Electronic device 10 of FIG. 1 may be a portable electronic device such as a camera, a cellular telephone, a tablet computer, a webcam, a video camera, a video surveillance system, an automotive imaging system, a video gaming system with imaging capabilities, or any other desired imaging system or device that captures digital image data. Camera module 12 may be used to convert incoming light into digital image data. Camera module 12 may include one or more lenses 14 and one or more corresponding image sensors 16. Lenses 14 may include fixed and/or adjustable lenses and may include microlenses formed on an imaging surface of image sensor 16. During image capture operations, light from a scene may be focused onto image sensor 16 by lenses 14. Image sensor 16 may include circuitry for converting analog pixel data into corresponding digital image data to be provided to storage and processing circuitry 18. If desired, camera module 12 may be provided with an array of lenses 14 and an array of corresponding image sensors 16.

Storage and processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18 (e.g., using an image processing engine on processing circuitry 18, using an imaging mode selection engine on processing circuitry 18, etc.). Processed image data may, if desired, be provided to external equipment (e.g., a computer, external display, or other device) using wired and/or wireless communications paths coupled to processing circuitry 18.

Figure 2:
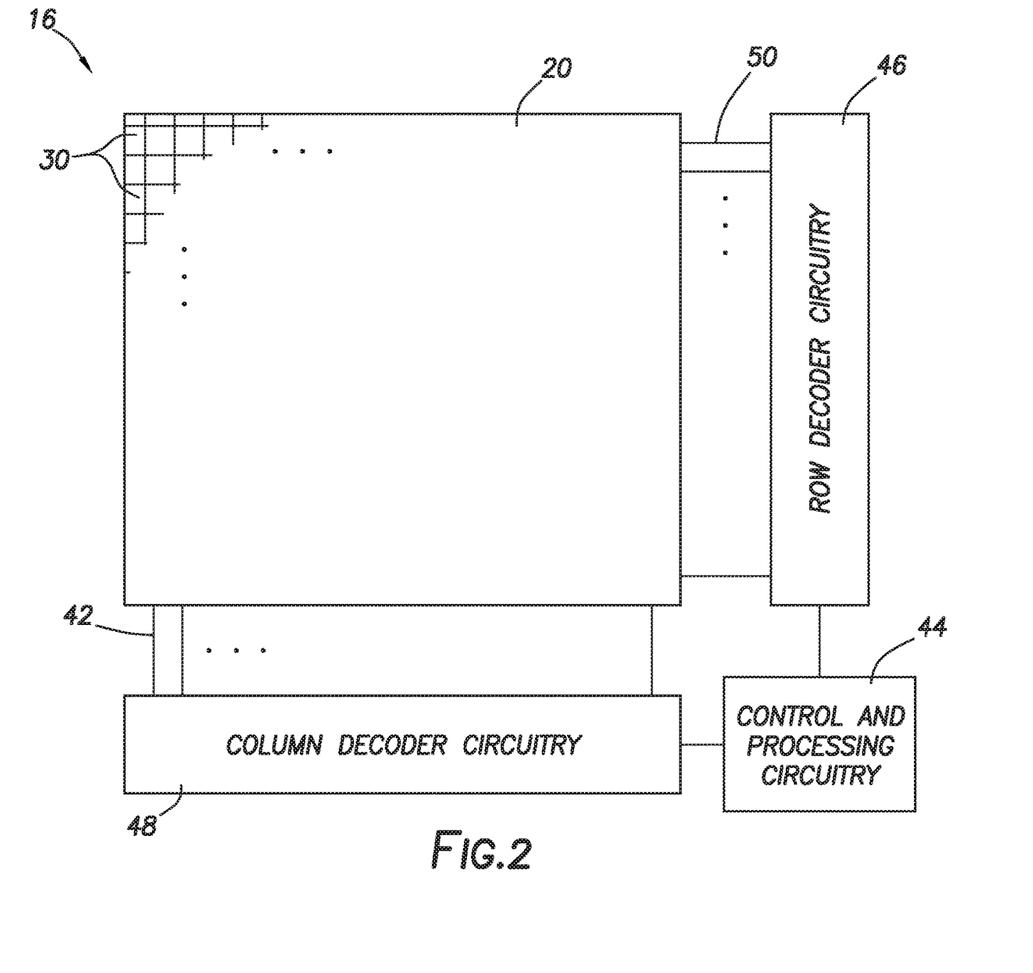
FIG. 2 is a diagram of an illustrative pixel array and associated readout circuitry for reading out image signals from the pixel array in accordance with an embodiment.

As shown in FIG. 2, image sensor 16 may include a pixel array 20 containing image sensor pixels 30 (sometimes referred to herein as image pixels or pixels) arranged in rows and columns and control and processing circuitry 44 (which may include, for example, image signal processing circuitry). Array 20 may contain, for example, hundreds or thousands of rows and columns of image sensor pixels 30. Control circuitry 44 may be coupled to row control circuitry 46 and column readout circuitry 48 (sometimes referred to herein as column control circuitry, readout circuitry, processing circuitry, or column decoder circuitry). Row control circuitry 46 may receive row addresses from control circuitry 44 and supply corresponding row control signals such as reset, row-select, charge transfer, dual conversion gain, and readout control signals to pixels 30 over row control lines 50. One or more conductive lines such as column lines 42 may be coupled to each column of pixels 30 in array 20. Column lines 42 may be used for reading out image signals from pixels 30 and for supplying bias signals (e.g., bias currents or bias voltages) to pixels 30. If desired, during pixel readout operations, a pixel row in array 20 may be selected using row control circuitry 46 and image signals generated by image pixels 30 in that pixel row can be read out along column lines 42.

Image readout circuitry 48 may receive image signals (e.g., analog pixel values generated by pixels 30) over column lines 42. Image readout circuitry 48 may include sample and hold circuitry for sampling and temporarily storing image signals read out from array 20, amplifier circuitry, analog-to-digital conversion (ADC) circuitry, bias circuitry, column memory, latch circuitry for selectively enabling or disabling the column circuitry, or other circuitry that is coupled to one or more columns of pixels in array 20 for operating pixels 30 and for reading out image signals from pixels 30. ADC circuitry in readout circuitry 48 may convert analog pixel values received from array 20 into corresponding digital pixel values (sometimes referred to as digital image data or digital pixel data). Image readout circuitry 48 may supply digital pixel data to control and processing circuitry 44 and/or processor 18 (FIG. 1) for pixels in one or more pixel columns.

Pixel array 20 may be provided with a color filter array having multiple color filter elements, which allows a single image sensor to sample light of different colors. As an example, image sensor pixels such as the image pixels in array 20 may be provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another suitable example, the green pixels in a Bayer pattern are replaced by broadband image pixels having broadband color filter elements (e.g., clear color filter elements, yellow color filter elements, etc.). These examples are merely illustrative and, in general, color filter elements of any desired color and in any desired pattern may be formed over any desired number of image pixels 30. A microlens may be formed over an upper surface of the color filter array to focus incoming light onto the photosensitive region associated with that pixel 30. A microlens may be formed over an upper surface of the color filter array to focus incoming light onto the photosensitive region associated with that pixel 30.

Figure 3:
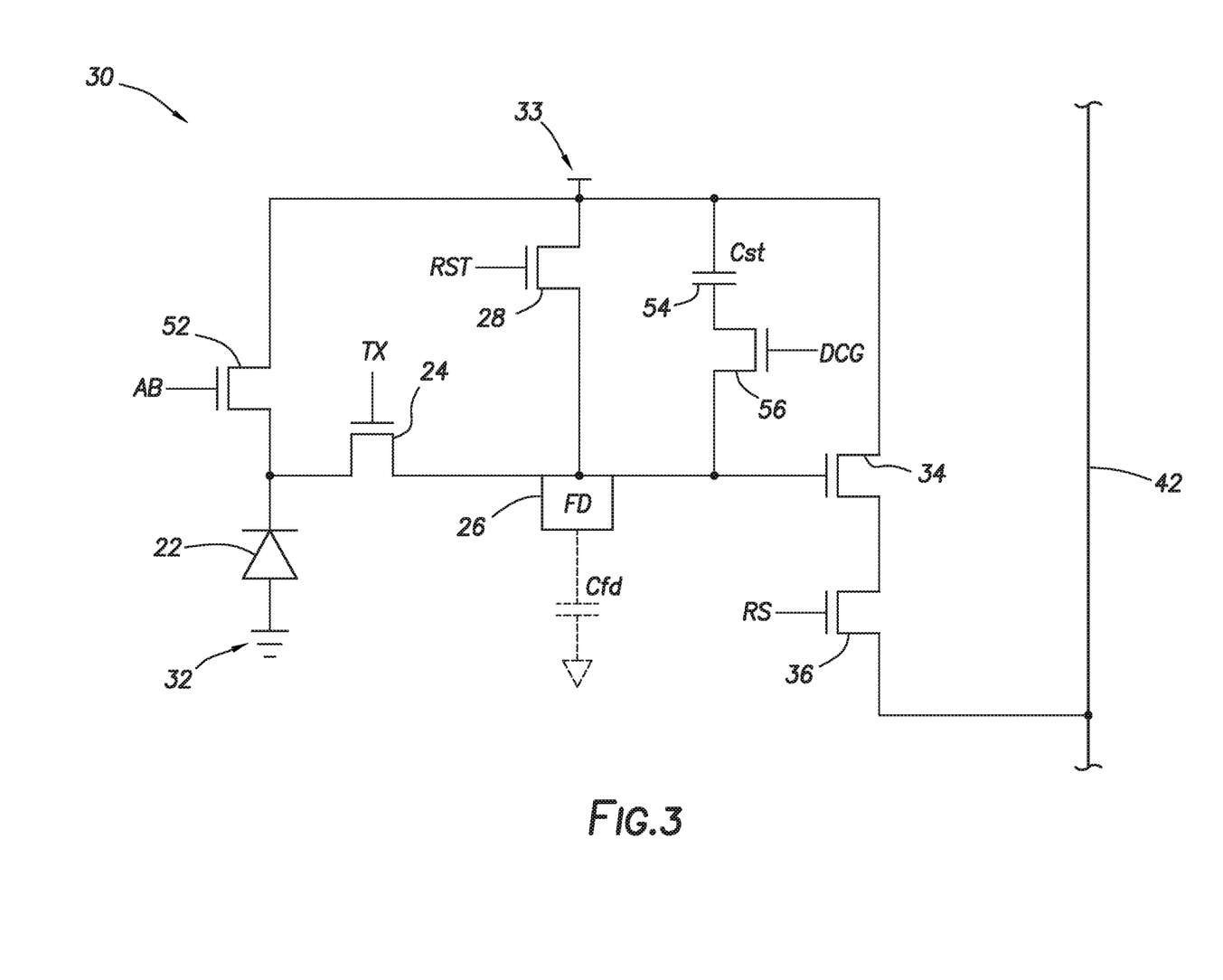
FIG. 3 is a schematic diagram of an illustrative image sensor pixel in accordance with an embodiment.

Circuitry in an illustrative image pixel 30 of image pixel array 16 is shown in FIG. 3. As shown in FIG. 3, pixel 30 may include a photosensitive element such as photodiode 22 (sometimes referred to herein as photodetector 22). A positive pixel power supply voltage (e.g., voltage Vaa_pix) may be supplied at positive power supply terminal 33. A ground power supply voltage (e.g., voltage Vss) may be supplied at ground terminal 32. Incoming light is gathered by photodiode 22 after passing through a color filter structure. Photodiode 22 converts the light to electrical charge.

Before an image is acquired, control signal AB may be asserted to turn on transistor 52 (e.g., asserted-high to activate the corresponding transistor) and reset photodiode 22 to a reset voltage (e.g., voltage Vaa_pix). Reset control signal RST may also be asserted. This turns on reset transistor 28 and resets charge storage node 26 (also referred to as a floating diffusion or a floating diffusion region) a reset voltage. The reset control signal RST may then be deasserted (e.g., asserted-low to deactivate a corresponding transistor) to turn off reset transistor 28. When control signal AB is deasserted to turn off transistor 52, signal acquisition may begin at photodiode 22. After an image acquisition process is complete, transfer gate control signal TX may be asserted to turn on transfer transistor (transfer gate) 24. When transfer transistor 24 is turned on, the charge that has been generated by photodiode 22 in response to incoming light is transferred to charge storage node 26.

Charge storage node 26 may be implemented using a region of doped semiconductor (e.g., a doped silicon region formed in a silicon substrate by ion implantation, impurity diffusion, or other doping techniques). The doped semiconductor region (i.e., the floating diffusion FD) may exhibit a capacitance (e.g., capacitance Cfd) that can be used to store the charge that has been transferred from photodiode 22. The signal associated with the stored charge on node 26 is buffered by source-follower transistor 34. Row select transistor 36 connects the source follower transistor 34 to column output line 42.

If desired, other types of image pixel circuitry may be used to implement the image pixels of sensors 16. For example, each image sensor pixel 30 (see, e.g., FIG. 1) may be a three-transistor pixel, a pinned-photodiode pixel with four transistors, a global shutter pixel, etc. The circuitry of FIG. 3 is merely illustrative.

Still referring to FIG. 3, pixel 30 may also include overflow capacitor 54 coupled to floating diffusion 26 via (overflow) transistor 56. In particular, pixel 30 may operate in an overflow mode of operation. In this mode of operation, pixel 30 may assert control signals TX and DCG to activate transistors 24 and 56, respectively. Capacitor 54 may have a storage capacity that is much larger than that of floating diffusion 26. As such, capacitor 54 may be used extend the dynamic range of pixel 30 by storing large amounts of (overflow) charge (e.g., in bright image spots or scenes). Pixel 30 may also operate in an LFM mode of operation, where control signals AB and TX (optionally in combination with control signal DCG) are asserted in an interweaved fashion acquire an image signal effectively during a short exposure period (e.g., a plurality of short integration periods within a long exposure period). In other words, when control signal AB is asserted-high, control signals TX and DCG are asserted-low, and vice versa. Operating pixel 30 in LFM mode allows pixel 30 to capture incident light that may otherwise evade capture due to flickering effects.

If desired, pixel 30 (in conjunction with other pixels 30 in array 20) may operate in an LFM mode and also operate in an HDR mode by generating multiple frames with varying exposure times (e.g., a short exposure frame, an intermediate exposure frame, and a long exposure frame). The multiple frames may be combined to generate a high dynamic range image. In this scenario, LFM image signals and HDR image signals from different frames may be read in an interweaved fashion (e.g., by reading out an LFM frame or row, a first (short) exposure frame or row, a second (intermediate) exposure frame or row, a third (long) exposure frame or row, another LFM frame or row, etc.) As an example, during LFM frame or row readout, signal acquisition of the first exposure frame or row may occur. As another example, during the third exposure frame or row readout, signal acquisition of the LFM frame or row may occur. If desired, pixel 30 may operate in an overflow mode and also in an HDR mode. In this scenario, overflow image signals and HDR image signals from different frames or rows may similarly generate image signals and be read out in a similar interweaved fashion.

However, issues may arise during pixel row readout operations. As an example, a pixel row read out when other (adjacent) rows are pulsing (e.g., asserting and deasserting) control signal AB (e.g., to generate image signals in LFM mode during LFM image acquisition) may have a reset level (e.g., voltage level Vaa_pix) and a signal level that is different from a pixel row read out when other (adjacent) rows are not pulsing control signal AB (e.g., during LFM image signal readout, during the image acquisition for the first, second, and third exposure frames, a time period during which LFM image acquisition does not occur etc.). Similarly, in overflow mode, a pixel row read out when other rows are pulsing control signals TX and DCG (e.g., to generate image signals in overflow mode during overflow image signal acquisition) may have a reset level and a signal level that is different from a pixel row read out when other rows are not pulsing control signals TX and DCG (e.g., a period during which overflow image acquisition does not occur). This means that different rows are read out using different reset voltage levels and different signal voltage levels, which results in undesirable image artifacts such as image banding.

Figure 4:
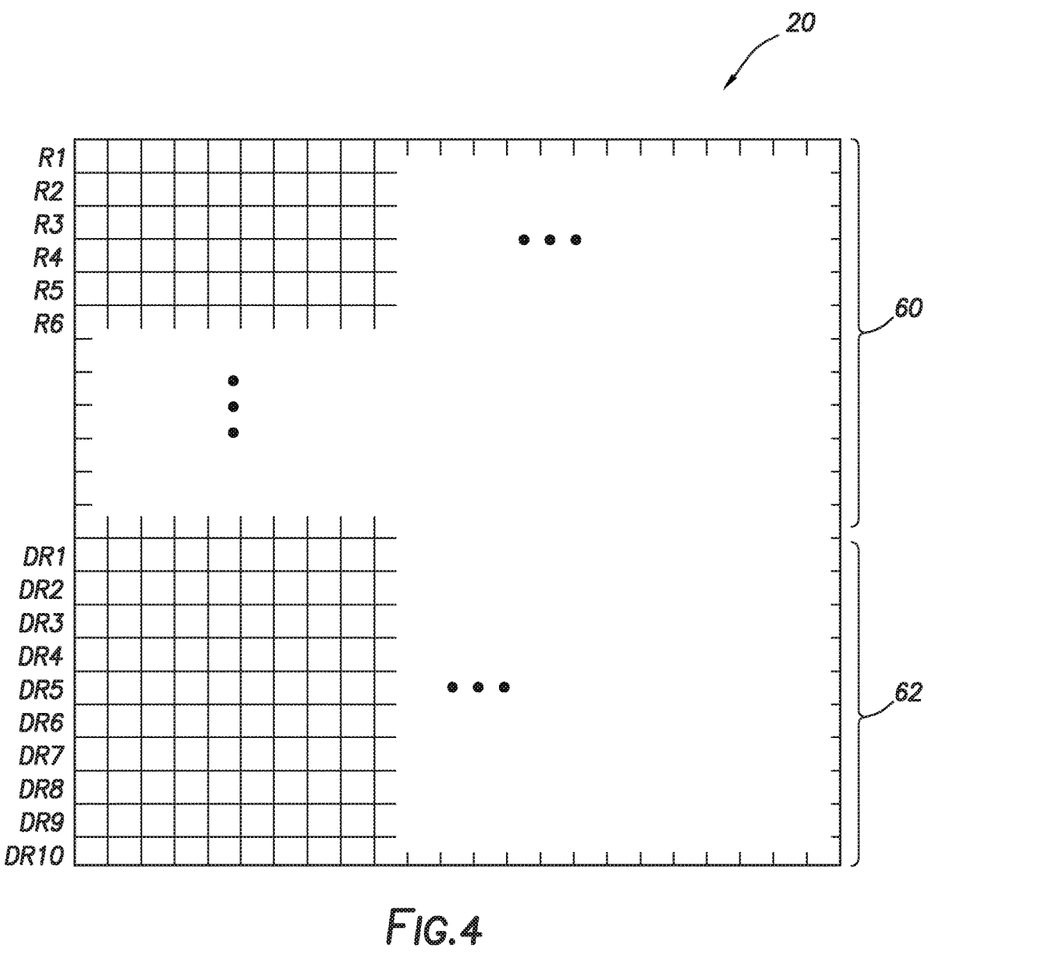
FIG. 4 is a diagram of an illustrative pixel array that includes active image pixel rows and dummy pixel rows in accordance with embodiment.

In order to mitigate these undesirable effects, an image sensor may be provided with dummy pixel rows as well as active image pixel rows. As an example, FIG. 4 shows an image sensor that includes active image pixel portion 60 and dummy image pixel portion 62. If desired, pixel portions 60 and 62 may be formed in the same image sensor array (e.g., array 20) as shown in FIG. 4 (e.g., portions 60 and 62 may be contiguous). However, this is merely illustrative. If desired, image sensor 16 of FIG. 1 may include two separate pixel arrays (e.g., formed on different substrates, formed during different fabrication steps, formed such that the arrays are not adjacent to each other, etc.) that respectively include active image pixel rows and dummy pixel rows. The example of pixel portions 60 and 62 forming array 20 is described herein as an example.

In particular, dummy pixel portion 62 may provide no image signals to column circuitry 48. As an example, dummy pixel portion 62 may be optically shielded from incident light, and as such, may include dark pixels that do not receive incident light. If desired, dummy pixel portion 62 may include active image pixels. Regardless, pixels in portions 60 and 62 may be configured to have the same circuitry (e.g., the same configuration of photodiodes, transistors, control signals, capacitors, storage regions, etc.). This way the dummy pixels and the active image pixels may share the same impedance and crosstalk environments. Pixels 30 in portion 62 may still receive row control signals (e.g., transistor control signals) from row control circuitry 46 via row lines 50 and may still be coupled to column decoder circuitry 48 via column lines 42. As another example, pixels in portions 60 and 62 may have different configurations. If desired, pixels in portion 60 may be pixels with full functionalities, while pixels in portion 60 may include limited functionalities (e.g., may include only transistors that receive suitable control signals, may omit a photodiode, may use a dummy photodiode, may use other substitute structures in place of corresponding structures shown in pixel 30, etc.)

As an example, active image pixel portion 60 may include image pixel rows R1-R6 (i.e., rows of image pixel R1-R6). Dummy pixel portion 62 may include dummy rows DR1-DR10 (i.e., rows of dummy pixels DR1-DR10). The number of rows in each of portions 60 and 62 is merely illustrative. If desired any number of rows may be in each portion.

Figure 5:
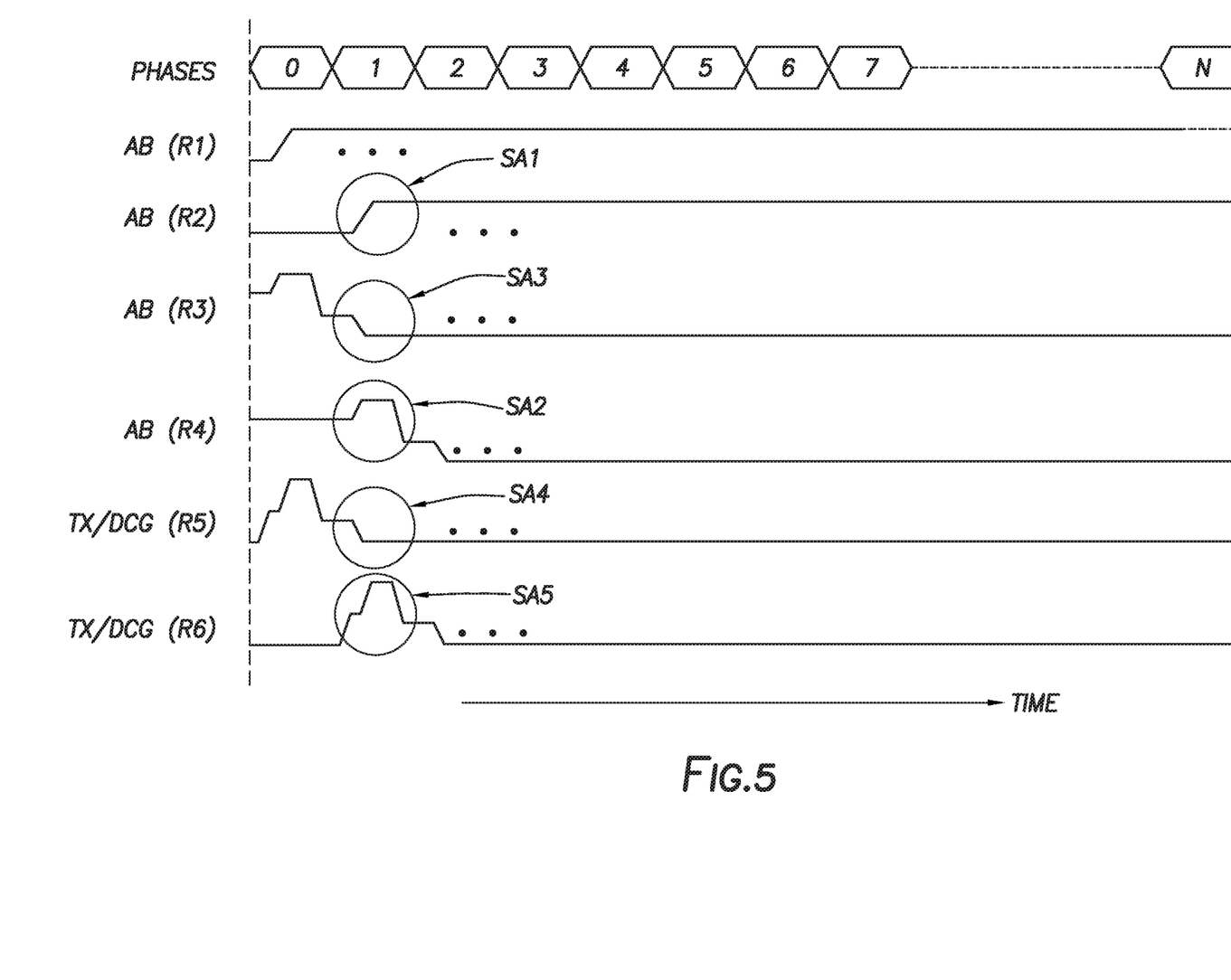
FIG. 5 is an illustrative timing diagram for operating active image pixel rows in accordance with an embodiment.

Pixels 30 in active pixel rows R1-R6 may generate image pixel signals in a parallel manner (e.g., in a rolling or offset manner). FIG. 5 shows illustrative transistor switching activities for pixels in respective rows (e.g., rows R1-R6 in FIG. 4). As an example, all pixels in a given row may receive the same control signal pulsing patterns or the same transistor switching activities. As shown in FIG. 5, control signal pulsing patterns may be distinguished in different phases 1, 2, 3, . . . , N. The different phases may be generated based on clocking circuitry in row circuitry 46 as an example. In particular, each phase may represent a set number of clock cycles of the clock circuitry, may represent an update in states of control signals (e.g., one or more changes in voltage levels of the control signals when active, no changes in voltage levels of the control signals when inactive) generated by row control circuitry 46.

In particular, rows R1-R6 may represent a portion of array 20 that operates in an LFM mode of operation, in which transistor 52, and the set of transistors 24 and 56 are pulsed in an interweaved manner through rows R1-R6 (e.g., with rolling control scheme between different rows) during LFM signal acquisition. To perform LFM operations using transistors 52, and the set of transistors 24 and 56, control signal AB may make three types of transitions and the set of control signals TX and DCG (e.g., switched in a synchronous manner) may make two distinct types of transitions. In other words, each LFM pulse represented by the combination of a single AB assertion and a single TX/DCG simultaneous assertion may use the five distinct types of transitions. Multiple LFM pulses may be performed by repeating these five distinct types of transitions. To operate multiple rows (e.g., rows R2-R6) in a parallel and offset manner, each of rows R2-R6 may take on a different one of the five distinct types of transitions.

As an example, during phase 1, control signal AB controlling one or more transistors 52 in row R2 (e.g., controlling a transistor 52 in a given pixel 30 in row R2, controlling multiple respective transistors 52 in corresponding pixels 30 in row R2) may transition (e.g., switch) from a ground voltage level (e.g., 0V) to a supply voltage level. This particular transition or set of transitions is referred to herein sometimes as switching activity 1 (i.e., SA1). A switching activity may sometimes also be referred to herein as a set of transitions, a set of voltage level shifts, a set of state shifts, or a transition type or type of transition. During the same phase 1, control signal AB controlling one or more transistors 52 in row R3 may transition from a boosted voltage level to the ground voltage level and subsequently from the ground voltage level to a bias voltage level (e.g., a negative voltage level, a reverse bias voltage level). This particular transition or set of transitions is referred to herein sometimes as switching activity 3 (i.e., SA3). During the same phase 1, control signal AB controlling one or more transistors 52 in row R4 may transition from the supply voltage level to the boosted voltage level. This particular transition or set of transitions is referred to herein sometimes as switching activity 2 (i.e., SA2).

Furthermore, during the same phase 1, control signals TX and DCG controlling one or more corresponding transistors 24 and 56 in row R5 may transition from the ground voltage level to the supply voltage level, from the supply voltage level to the boosted voltage level and from the boosted voltage level back to the ground voltage level. This particular transition or set of transitions is referred to herein sometimes as switching activity 4 (i.e., SA4). During the same phase 1, control signals TX and DCG control one or more corresponding transistors 24 and 56 in row R6 may transition from the ground voltage level to the negative voltage level. This particular transition or set of transitions is referred to herein sometimes as switching activity 5 (i.e., SA5). In this scenario, the booster voltage level may have the highest voltage level, the supply voltage level may have a second highest voltage level, the bias voltage level may have the lowest voltage level, and the ground voltage may have the second lowest voltage level.

During the light flickering mitigation mode of operation, at least rows R2-R6 may continuously switch between these five switching activities to periodically activate respective transistors 52, 24, and 56 to (partially or fully) to move charge in respective photodiodes 22. As a further example, other activities may occur for control signal AB (e.g., maintaining voltage at the supply voltage level, the ground voltage level, the boosted voltage level, transiting between the negative voltage level to the ground voltage level). However, these activities are not further described in order to not unnecessarily obscure the description of the invention. Dummy rows described herein may similarly account for any additional suitable transitions if desired.

Transitions such as SA1-SA5 in rows R2-R6 may occur simultaneously during signal readout for some rows of pixels 30 (e.g., during readout of an HDR frame before an LFM frame is read out, during a frame read out when array 20 performs LFM image acquisition in parallel, etc.), but may not occur during signal readout for other rows of pixels 30 (e.g., when an LFM frame are being readout, during a frame read out when array 20 is not performing LFM image acquisition in parallel). As such, the environment in which signal readouts occur for some rows and/or frames differ from other rows and/or frames. As an example, some rows may receive a first varied reset voltage level and a first varied signal voltage level when other rows are not pulsing control signals AB and TX/DCG (e.g., control signals AB are maintained at a reference or ground voltage level instead of engaging in SA1-SA5). On the other hand, other rows may receive a second standard reset voltage level and a second standard signal voltage level that differs from the first reset voltage level and the first signal voltage level when other rows are pulsing control signals AB and TX/DCG (e.g., engaging in SA1-SA5).

Figure 6:
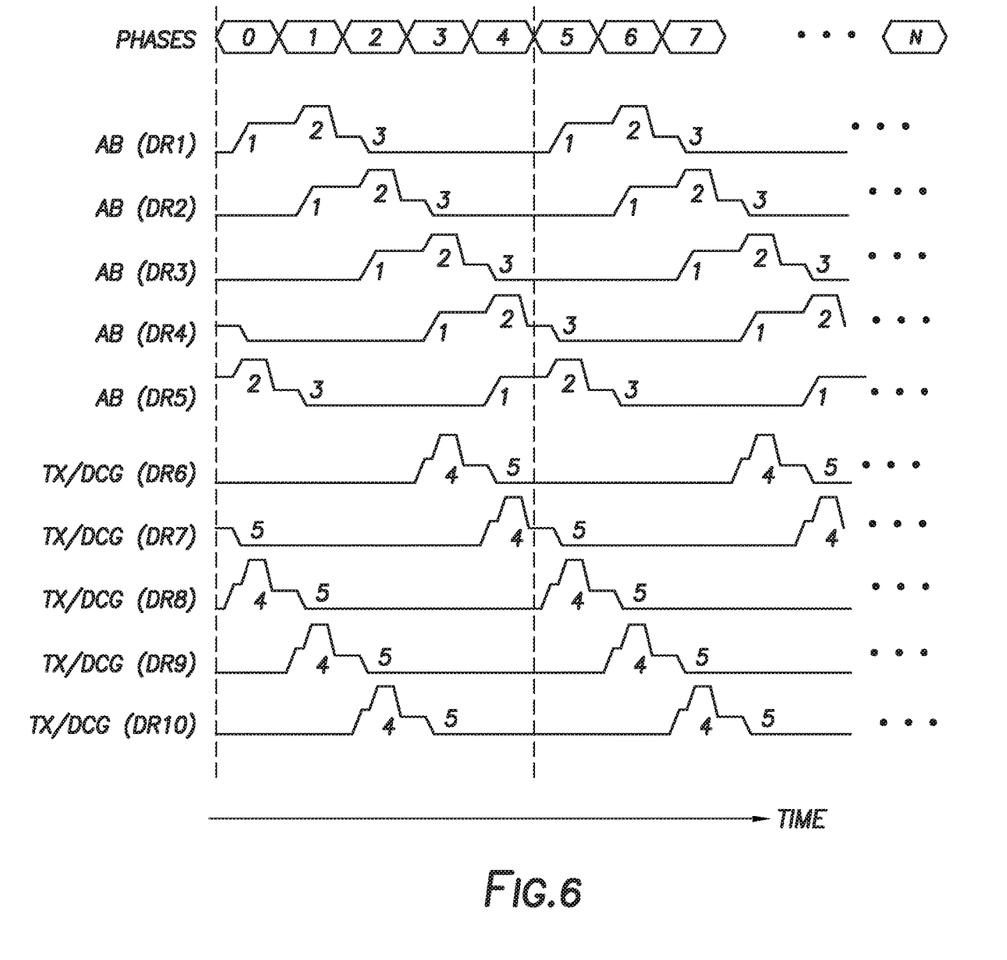
FIG. 6 is an illustrative timing diagram for operating dummy pixel rows in accordance with embodiment.

As shown in FIG. 6, dummy rows DR1-DR10 may be provided to mimic the control signal transitions (e.g., control signal AB transitions such as SA1-SA3, control signal TX/DCG transitions such as SA4 and SA5). During each phase, at least one of rows DR1-DR10 provides at least one of the switching activities SA1-SA5 (for the sake of clarity abbreviated as "1", "2", "3", "4", and "5", respectively).

In particular, during phase 0, one or more transistors 52 (in respective dummy pixels 30) in row DR1 may receive control signal AB transitioning using SA1, one or more transistors 52 in row DR5 may receive control signal AB transitioning using SA2, one or more transistors 52 in DR4 may receive control signal AB transitioning using SA3, one or more transistors 24 and 56 in DR8 may receive control signals TX and DCG transitioning using SA4, and one or more transistor 24 and 56 in DR7 may receive control signals TX and DCG transitioning using SA5. Similarly, during phase 1, rows DR2, DR1, DR5, DR9, and DR8 may respectively receive corresponding control signals AB or control signals TX and DCG transitioning using SA1-SA5.

Take as an example the scenario where during phase 7, readout circuitry is reading out image signals in pixels 30 of an active pixel row for an HDR frame, during which no other active pixel rows is performing LFM image acquisition (e.g., receive control signals AB, TX, and/or DCG pulsing at any of SA1-SA5). In this scenario and without any dummy rows, image signals read out from row R1 will be read out with a varied reset voltage level and a varied signal voltage level that is different from a standard reset voltage level and a standard signal voltage level leading to image artifacts. However, with inclusion of at least dummy rows DR1-DR3, DR9 and DR10, which mimic an environment in which SA1-SA5 occur, image signals readout out from row R1 will be readout with a standard reset voltage level and a standard signal voltage level similar to other row readouts (e.g., from other HDR exposure frames, from an LFM frame).

Dummy LFM rows DR1-DR10 may be coupled to active LFM mode pixel rows R1-R6 such that SA1-SA5 effects may be coupled to the readout operations of rows R1-R6. As examples, rows R1-R6 and rows DR1-DR10 be coupled to the same power supply circuitry (e.g., circuitry that supplies a pixel supply or reset voltage), may be coupled to each other via respective column lines, may be provided adjacent to each other, etc. In other words, each respective pixel column in array 20 may include a set of dummy pixels that are coupled to the active pixels in the pixel column and that provide switching activity effects to the active pixels in the pixel column.

The illustrative examples of FIGS. 4-6 are merely illustrative. If desired, active pixel row portion 60 and dummy pixel row portion 62 in FIG. 4 may be formed in any suitable configuration that provides the control signal coupling effects described herein. As an example, portion 62 may be formed at a top portion of array 20, whereas portion 60 may be formed at bottom portion of array 20. As another example, dummy row portion 62 may be split into multiple segments (e.g., rows DR1-DR5 for control signal AB and rows DR6-DR10 for control signals TX and DCG), which are placed in different location with respect to the active pixel row portion 60. In particular, rows R1-R6 need not be adjacent rows as shown in FIG. 4, and similarly rows DR1-DR10 need not be adjacent rows. If desired, rows R1-R6 may be interspersed through array 20 in any suitable manner. As another particular example, dummy rows may be interposed between differ portions of active pixel rows.

If desired, one or more control signals (e.g., control signals AB and/or DCG) in FIGS. 5 and 6 may be omitted (e.g., when pixel 30 does not include transistor 52, when pixel 30 does not include transistor 56 and capacitor 54, etc.). If desired, additional control signals and corresponding switching activities for the additional control signals may be incorporated into portions 60 and 62 and corresponding timing diagrams for operating portions 60 and 62.

While FIG. 5 shows SA1-SA5 during phase 1 but not subsequent phases (or in some cases phase 0), this was done for the sake of clarity (e.g., to clearly show SA1-SA5 during phase 1). During phases 0 and 2-N, rows R1-R6 may alternate between SA1-SA5, may maintain a particular voltage when inactive (e.g., when LFM image acquisition is not performed, when overflow image acquisition is not performed, etc.), or may implement any suitable switching activity. As previously described, active row portion 60 may include additional rows such as rows R7, R8, . . . , RN. Because there are five distinct types of transitions (e.g., SA1-SA5), each set of five additional rows may repeat the types of transitions during LFM image acquisition, as an example.

While FIG. 6 shows ten dummy rows (e.g., rows DR1-DR10), this is merely illustrative. Any number of dummy rows may be provided as long as each suitable switching activity implemented or experienced by the active pixels can be implemented on the number of dummy rows. The number of dummy rows may also change depending on a configuration of pixel 30 (e.g., pixel 30 without transistor 52 may not require dummy rows DR1-DR5). If desired, pixel 30 may be configured to implement a wide range of functionalities (e.g., LFM, overflow, HDR functionalities). However, pixel 30 may be controlled to provide a subset of the functionalities. As an example, while pixel 30 may include transistor 52, which enables LFM functionalities, pixel 30 may be operated in an overflow mode of operation but not an LFM mode of operation. In this scenario, rows of dummy row portion 62 may be deactivated or inactive (e.g., may not receive any control signal pulses or switching activities).

In particular, as previously described, pixels 30 in array 20 may also operate in an overflow mode of operation in combination with an HDR mode of operation (e.g., generate an overflow image frame and multiple other image frames at different exposure times). This combined mode of operation may face similar undesired image artifacts (e.g., banding effects) as described for the combined mode of operation with LFM and HDR. As an example, pixels 30 in rows R5 and R6 (in FIG. 4) may operate in an overflow mode of operations (e.g., pixels in rows R5 and R6 may receive simultaneous pulses of control signals TX and DCG as shown in FIG. 5). During the over flow mode of operation pulses of control signal AB in rows R1-R4 described in connection with an LFM mode of operation may be omitted (e.g., control signal AB may be kept at a low level throughout overflow image acquisition). In this scenario, to mitigate the previously mentioned banding effects, dummy rows DR6-DR10 may be used to provide switching activities 4 and 5 during each phase. If desired, dummy rows DR1-DR5 may be kept at a low voltage during overflow mode of operation. Because control signals TX and DCG correspond to only two switching activities, fewer than five dummy rows (e.g., two dummy rows) may be used to mimic switching activities 4 and 5, if desired.

Active pixel rows may receive control signals that have a corresponding number of switching activities or set of transitions. These switching activities may occur during readout operations for some active image pixel rows or frames but not during readout operations for other active image pixel rows or frames, especially in the case where frames of multiple types are generated by the same pixel array in an interweaved manner. This can lead to different readout environments (e.g., having different reset voltage levels and different signal voltage levels) for readout operations corresponding to different rows and/or frames. To mitigate these adverse effects, an image sensor may include dummy pixel rows that continuously pulse the switching activities to ensure the readout operations for all rows have the same readout environments (e.g., have the same reset voltage levels and the same signal voltage levels during readout operations).

Figure 7:
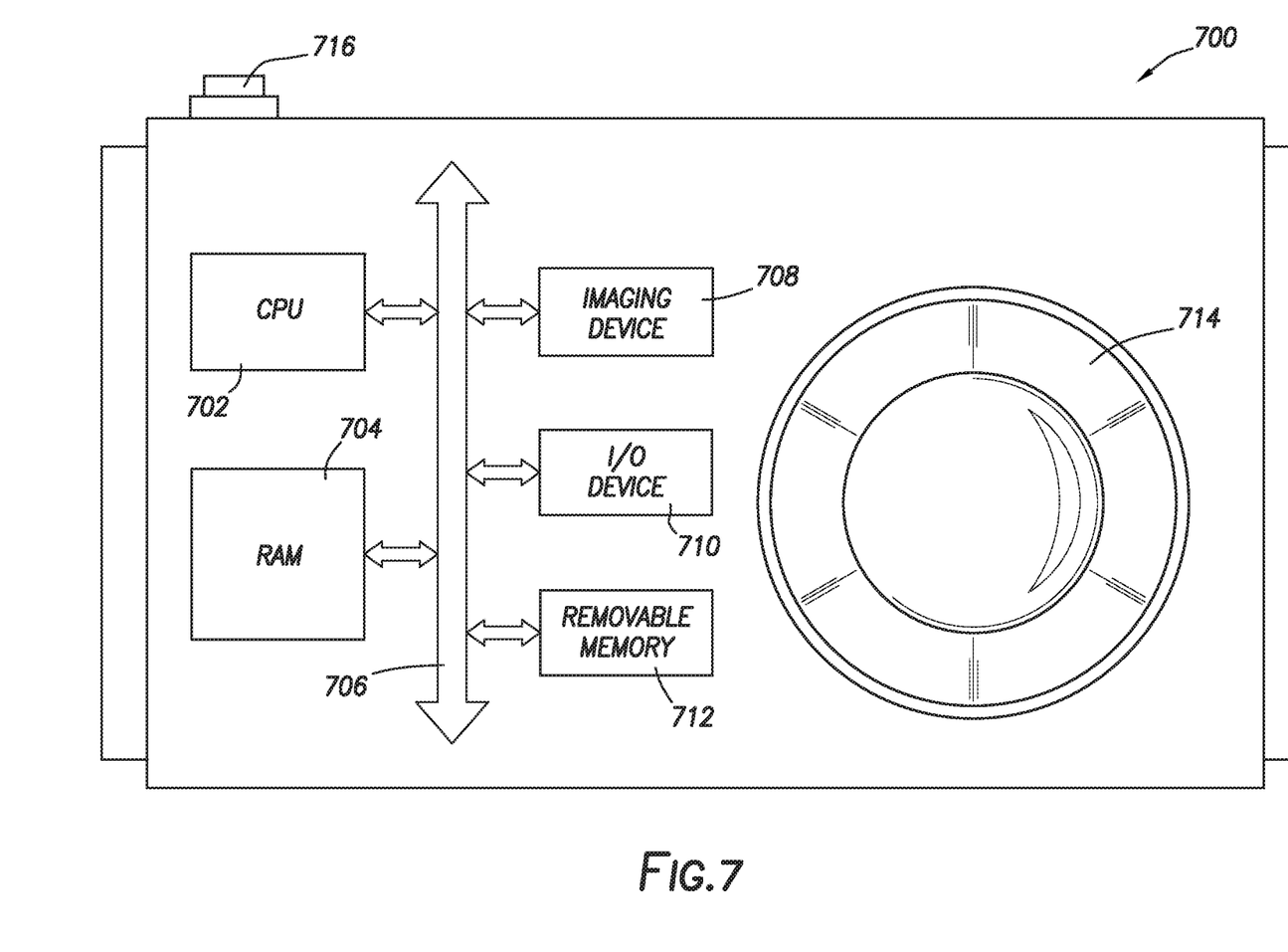
FIG. 7 is a block diagram of a processor system employing the embodiments of FIGS. 1-6 in accordance with an embodiment.

FIG. 7 is a simplified diagram of an illustrative processor system 700, such as a digital camera, which includes an imaging device 708 (e.g., camera module 12 of FIG. 1) employing an image sensor as described above in connection with FIGS. 1-6. Without being limiting, such a system could include a computer system, still or video camera system, scanner, machine vision system, vehicle navigation system, video phone, surveillance system, auto focus system, star tracker system, motion detection system, image stabilization system, and other systems employing an imaging device.

Processor system 700, for example a digital still or video camera system, generally includes a lens 714 for focusing an image onto one or more pixel array in imaging device 708 when a shutter release button 716 is pressed and a central processing unit (CPU) 702 such as a microprocessor which controls camera and one or more image flow functions. Processing unit 702 can communicate with one or more input-output (I/O) devices 710 over a system bus 706. Imaging device 708 may also communicate with CPU 702 over bus 706. System 700 may also include random access memory (RAM) 704 and can optionally include removable memory 712, such as flash memory, which can also communicate with CPU 702 over the bus 706. Imaging device 708 may be combined with the CPU, with or without memory storage on a single integrated circuit or on a different chip. Although bus 706 is illustrated as a single bus, it may be one or more busses, bridges or other communication paths used to interconnect system components of system 700.

Various embodiments have been described illustrating systems with and methods for image sensors having dummy pixel rows.

In an embodiment, an image sensor may include one or more rows of active image pixels (e.g., at least one given image pixel) that receive a control signal configured to have multiple switching activities (e.g., transition types) during respective time periods (e.g., phases). The image sensor may also include one or more rows of dummy image pixels that are coupled to the rows of active image pixels. The plurality of dummy pixel rows may include a first set of dummy pixel rows that each receive a signal corresponding to the control signal. During each of the respective time periods, the signals received by the first set of dummy pixel rows may include each transition type for the control signal.

The one or more rows of active image pixels may receive an additional control signal configured to have multiple switching activities (e.g., transition types), the plurality of dummy pixel rows may include a second set of dummy pixel rows that each receive an additional signal corresponding to the additional control signal. During each of the respective time periods, the additional signals received by the second set of dummy pixel rows may include each transition type for the additional control signal.

The at least one given image pixel may include a photosensitive element (e.g., photodiode) coupled to a power supply terminal via an anti-blooming transistor. The photosensitive element may be coupled to a floating diffusion region via a transfer transistor. The floating diffusion region may be coupled to an overflow capacitor via an overflow transistor. The anti-blooming transistor may receive the control signal. One of the transfer transistor and the overflow transistor may receive the additional control signal. The other one of the transfer and the overflow transistor may receive a third control signal. The second set of dummy pixel rows may each also receive a third signal corresponding to the third control signal. The third control signal may have the same possible switching activities as the additional control signal.

Row control circuitry may be coupled to each row of active image pixels via at least one or more row control signals and may be coupled to each row of dummy pixels via at least one or more additional row signals. In particular, row control circuitry may generate the control signal, the signals corresponding to the control signal, the additional control signal, the additional signals corresponding to the additional control signal, the third control signal, the third signals corresponding to the third control signal. The one or more rows of dummy image pixels may be formed separately from the one or more rows of active image pixels.

If desired, the one or more rows of dummy image pixels may be formed contiguously with the one or more rows of active image pixels in the same pixel array. In particular, each column of the pixel array may include at least a plurality of image pixels from each of the one or more rows of active image pixels. Each column of the pixel array may also include at least a plurality of dummy pixels from each of the one or more rows of dummy pixels. During readout operations of the one or more rows of active image pixels, the one or more rows of dummy pixels may mimic any possible switching activities by receive the signals, the additional signals, and the third signals to mitigate any image artifacts (e.g., banding caused by varying reset voltage levels and signal voltage levels across different rows during readout operations).

The foregoing is merely illustrative of the principles of this invention and various modifications can be made by those skilled in the art without departing from the scope and spirit of the invention. The foregoing embodiments may be implemented individually or in any combination.

What is claimed is:

1. An image sensor, comprising:
    at least one row of active image pixels that receives a control signal configured to exhibit a plurality of transition types during a plurality of respective time periods, wherein the plurality of transition types comprises first and second different transition types for the control signal; and
    a plurality of dummy pixel rows that are coupled to the at least one row of active image pixels and that each receive a signal corresponding to the control signal, wherein, during each time period in the plurality of respective time periods, the signal received by one row in the plurality of dummy pixel rows is configured to exhibit the first transition type and the signal received by another row in the plurality of dummy pixel rows is configured to exhibit the second transition type.

2. The image sensor defined in claim 1, further comprising:
    row control circuitry configured to provide the control signal to the at least one row of active image pixels and configured to provide the signals to the plurality of dummy pixel rows.

3. The image sensor defined in claim 2, wherein the at least one row of active image pixels receives an additional control signal configured to exhibit a plurality of additional transition types during the plurality of respective time periods and wherein the plurality of dummy pixel rows each receive an additional signal corresponding to the additional control signal.

4. The image sensor defined in claim 3, wherein, during each time period in the plurality of respective time periods, the additional signals received by the plurality of dummy pixel rows includes each additional transition type in the plurality of additional transition types.

5. The image sensor defined in claim 3, wherein the plurality of dummy pixel rows comprises:
    a first set of dummy pixel rows configured to receive the signals corresponding to the control signal; and
    a second set of dummy pixel rows configured to receive the additional signals corresponding to the additional control signal.

6. The image sensor defined in claim 5, wherein, during each time period in the plurality of respective time periods, the signals received by the first set of dummy pixel rows include each transition type in the plurality of transition types, and the additional signals received by the second set of dummy pixel rows include each additional transition type in the plurality of additional transition types.

7. The image sensor defined in claim 1, wherein the at least one row of active image pixels includes a given image pixel that comprises:
    a photosensitive element; and
    a transistor that couples the photosensitive element to a power supply terminal, wherein the transistor is configured to receive the control signal.

8. The image sensor defined in claim 7, wherein the given image pixel includes a floating diffusion region coupled to the photosensitive region via an additional transistor, wherein the additional transistor is configured to receive an additional control signal configured to exhibit a plurality of additional transition types during the plurality of respective time periods and wherein the plurality of dummy pixel rows each receive an additional signal corresponding to the additional control signal.

9. The image sensor defined in claim 8, wherein the given image pixel includes a capacitor coupled to the floating diffusion region via a third transistor, wherein the third transistor is configured to receive a third control signal configured to exhibit the plurality of additional transition types during the plurality of respective time periods.

10. The image sensor defined in claim 9, wherein the plurality of dummy pixel rows each receive a third signal corresponding to the third control signal.

11. The image sensor defined in claim 10, wherein the plurality of dummy pixel rows comprise:
    a first set of dummy pixel rows configured to receive the signals corresponding to the control signal; and
    a second set of dummy pixel rows configured to receive the additional signals corresponding to the additional control signal and the third signal corresponding to the third control signal.

12. The image sensor defined in claim 1, wherein the at least one row of active image pixels and the plurality of dummy pixel rows form a contiguous pixel array.

13. The image sensor defined in claim 1, wherein the at least one row of active image pixels is formed separately from the plurality of dummy pixel rows.

14. A method of operating an image sensor that includes a plurality of active image pixels arranged in a plurality of rows and a plurality of dummy pixels arranged in a plurality of additional rows, the method comprising:
    with a given active image pixel in the plurality of active image pixels, generating image signals based at least in part on receiving a control signal exhibiting a plurality of switching activities for the control signal during a plurality of phases;
    performing a readout operation on the plurality of active image pixels; and
    while performing the readout operation, at the plurality of dummy pixels, receiving a plurality of signals that each exhibit a different switching activity in the plurality of switching activities for the control signal during a same phase in the plurality of phases.

15. The method defined in claim 14, wherein the given active image pixel includes a photodiode coupled to a power supply terminal via a transistor, the method further comprising:
    with the transistor, receiving the control signal.

16. The method defined in claim 15, wherein the given active image pixel includes an additional transistor, the method further comprising:
    with the additional transistor, receiving an additional control signal exhibiting a plurality of additional switching activities during the plurality of phases; and
    while performing the readout operation, at the plurality of dummy pixels, receiving a plurality of additional signals that each exhibit a different switching activity in the plurality of additional switching activities during the same phase in the plurality of phases.

17. The method defined in claim 14, wherein receiving the plurality of signals comprises:
    while performing the readout operation, at the plurality of dummy pixels, receiving the plurality of signals that each exhibit the different switching activity in the plurality of switching activities during each phase in the plurality of phases.

18. An image sensor, comprising:
- a plurality of pixels arranged in at least one column, wherein the plurality of pixels comprise an active image pixel and a plurality of dummy pixels, wherein the active image pixel receives at least one control signal configured to have a plurality of switching activities, and wherein a set of dummy pixels in the plurality of dummy pixels is configured to respectively receive corresponding signals having each switching activity in the plurality of switching activities, wherein the switching activity of each corresponding signal is different, and wherein the plurality of switching activities include first, second, and third different transitions, each between two different voltage levels; and
- column readout circuitry coupled to a set of active image pixels and including the active image pixel and coupled to the set of dummy pixels via a column line.

19. The image sensor defined in claim 18, wherein the active image pixel receives an additional control signal configured to have a plurality of additional switching activities and wherein an additional set of dummy pixels in the plurality of dummy pixels is configured to respectively receive corresponding additional signals having each switching activity in the plurality of additional switching activities.

20. The image sensor defined in claim 18, wherein the first transition is from a ground voltage level to a supply voltage level, the second transition is from the supply voltage level to a boosted voltage level, and the third transition is from the boosted voltage level to a bias voltage level.

* * * * *